(12) United States Patent
Fujinaka et al.

(10) Patent No.: US 8,776,123 B2
(45) Date of Patent: Jul. 8, 2014

(54) TELEVISION APPARATUS AND CONTROL METHOD THEREOF

(75) Inventors: Yuuka Fujinaka, Kawasaki (JP); Shuntaro Aratani, Machida (JP); Kazuna Maruyama, Fuchu (JP); Eito Sakakima, Tokyo (JP); Satoshi Ukawa, Komae (JP); Satoshi Hanamitsu, Kawasaki (JP); Koji Mito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 12/578,450

(22) Filed: Oct. 13, 2009

(65) Prior Publication Data

US 2010/0095327 A1 Apr. 15, 2010

(30) Foreign Application Priority Data

Oct. 15, 2008 (JP) ................................ 2008-266525

(51) Int. Cl.
*H04N 5/445* (2011.01)

(52) U.S. Cl.
USPC ................................ 725/41; 725/45; 725/50

(58) Field of Classification Search
USPC ......................................... 725/41, 44, 52, 61
See application file for complete search history.

(56) References Cited

U.S. PATENT DOCUMENTS

| | | | | |
|---|---|---|---|---|
| 6,115,080 A | * | 9/2000 | Reitmeier | 348/731 |
| 2002/0151327 A1 | * | 10/2002 | Levitt | 455/556 |
| 2002/0194600 A1 | * | 12/2002 | Ellis et al. | 725/41 |
| 2004/0078811 A1 | * | 4/2004 | Urdang | 725/44 |
| 2005/0240655 A1 | * | 10/2005 | Lipton et al. | 709/207 |
| 2007/0113248 A1 | * | 5/2007 | Hwang et al. | 725/45 |
| 2007/0296863 A1 | * | 12/2007 | Hwang et al. | 348/563 |
| 2008/0077959 A1 | | 3/2008 | Kirimura | |
| 2008/0229351 A1 | | 9/2008 | Torimaru | |

FOREIGN PATENT DOCUMENTS

| | | |
|---|---|---|
| JP | 2002-027363 A | 1/2002 |
| JP | 2007-049398 A | 2/2007 |
| JP | 2008-079086 A | 4/2008 |
| JP | 2008-244695 A | 10/2008 |
| JP | 2009-021902 A | 1/2009 |

\* cited by examiner

*Primary Examiner* — Benjamin R Bruckart
*Assistant Examiner* — Carmine Malangone
(74) *Attorney, Agent, or Firm* — Canon USA, Inc., IP Division

(57) ABSTRACT

A television apparatus includes a plurality of receiving units. The television apparatus includes a first receiving unit configured to receive a channel which broadcasts a program whose video image is displayed on a display unit, a second receiving unit configured to receive a plurality of channels while the video image is being displayed, a program information management unit configured to store genre information about programs broadcasted on the plurality of channels, and a control unit configured to determine a periodic check order of receiving the plurality of channels based on the genre information about the programs read by the program information management unit and to control the second receiving unit to periodically check and receive the plurality of channels according to the periodic check order.

16 Claims, 13 Drawing Sheets

| PERIODIC CHECK FREQUENCY | GENRE |
|---|---|
| HIGH | DRAMA / MOVIE / VARIETY SHOW |
| MIDDLE | MUSIC |
| LOW | SPORTS |

FIG. 4

| PERIODIC CHECK FREQUENCY | GENRE |
|---|---|
| HIGH | DRAMA / MOVIE / VARIETY SHOW |
| MIDDLE | MUSIC |
| LOW | SPORTS |

TELEVISION APPARATUS AND CONTROL METHOD THEREOF

BACKGROUND OF THE INVENTION

1. Field of the Invention

The present invention relates to a television apparatus that receives television broadcasts and generates a program table on different channels, and a control method thereof.

2. Description of the Related Art

In digital broadcasting, program information (such as a broadcasting channel and a program title) is transmitted along with video data and audio data that configure program data. Such program information is used to generate an electric program guide (EPG) and a program table on different channels. The program table on different channels is an EPG that describes detailed information about programs on different channels that are being broadcasted concurrently with a program currently being viewed. A user can thus acquire information about the programs on different channels by displaying information about the programs on different channels without switching a channel. Japanese Patent Application Laid-Open No. 2007-049398 discusses an information recording and reproducing apparatus that stores program data of an effective broadcasting channel at fixed time intervals. The information recording and reproducing apparatus then generates thumbnail images from the stored program data and displays the thumbnail images and the program titles in the EPG.

Further, Japanese Patent Application Laid-Open No. 2002-027363 discusses a thumbnail generating apparatus which analyzes reproduced moving image data and generates the thumbnail image data based on frame information of the image in which a face is captured.

However, the information recording and reproducing apparatus discussed in Japanese Patent Application Laid-Open No. 2007-049398 does not use program information to generate the thumbnail image. The information recording and reproducing apparatus thus does not provide information about the programs on different channels according to user preferences. Further, since the information recording and reproducing apparatus uniformly and periodically checks and receives all channels without weighting the channels, the apparatus does not employ an efficient method of periodic reception. Furthermore, the thumbnail generating apparatus discussed in Japanese Patent Application Laid-Open No. 2002-027363 is only effective for recorded content and cannot be effectively applied to a program being broadcast on a different channel.

SUMMARY OF THE INVENTION

The present invention is directed to displaying a latest thumbnail image from which a face is efficiently extracted in a program table on different channels, so that a user can easily understand content of a program on a different channel.

According to an aspect of the present invention, a television apparatus having a plurality of receiving units includes a first receiving unit configured to receive a channel which broadcasts a program whose video image is displayed on a display unit, a second receiving unit configured to receive a plurality of channels while the video image is being displayed, a program information management unit configured to store genre information about programs broadcasted on the plurality of channels, and a control unit configured to determine a periodic check order of receiving the plurality of channels based on the genre information about the programs read by the program information management unit and to control the second receiving unit to periodically check and receive the plurality of channels according to the periodic check order.

According to the present invention, thumbnail image data including face information can be efficiently generated by appropriately setting an order of periodically checking and receiving channels. Further, a program table on different channels that include thumbnail images of faces extracted from programs on different programs being broadcasted is displayed. In such a case, if the program is of a genre in which the face information is useful, the thumbnail images are sequentially updated along with progress of the program. As a result, user-friendliness in selecting a program can be improved.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
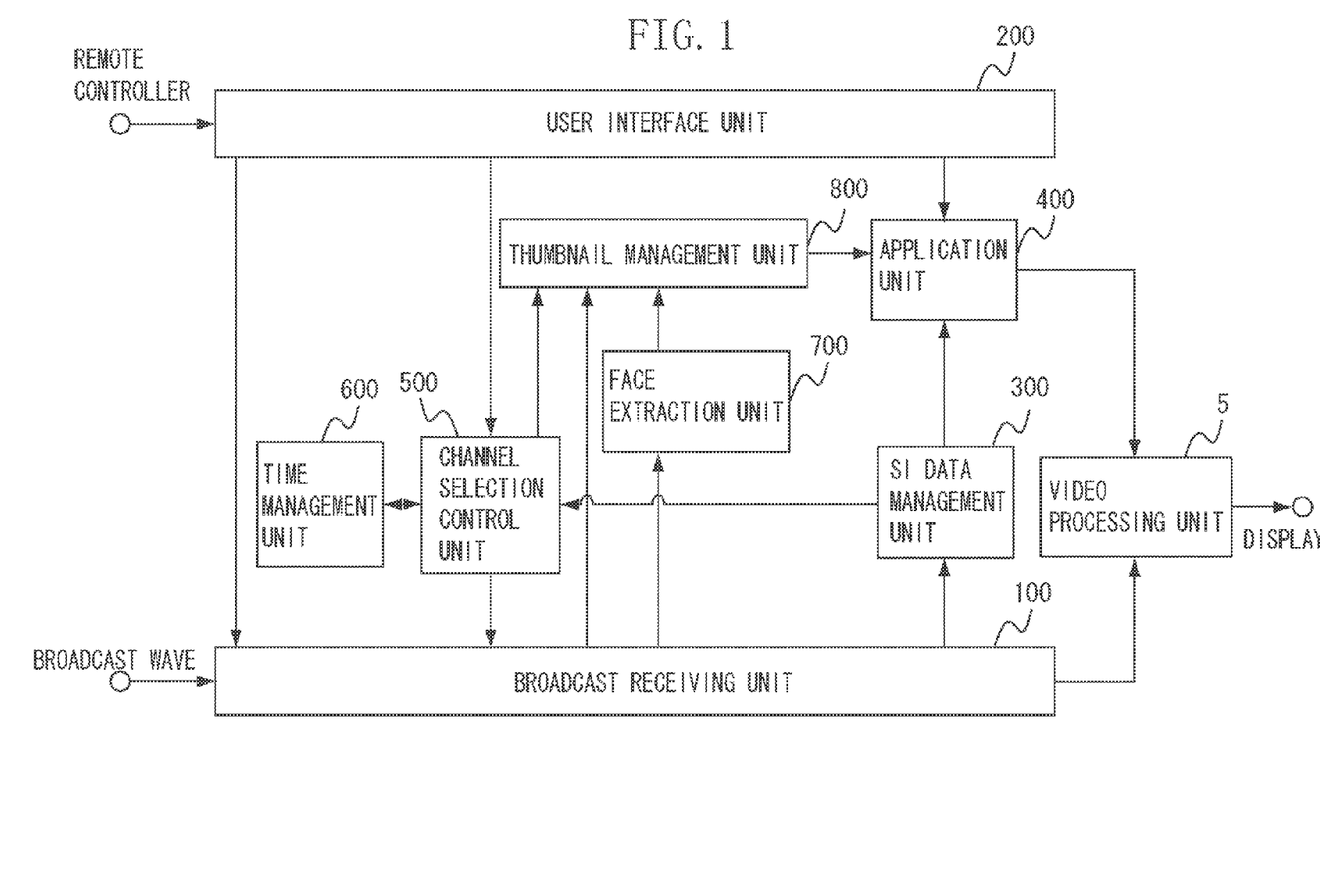
FIG. 1 is a block diagram illustrating a television apparatus according to an exemplary embodiment of the present invention.
Figure 2:
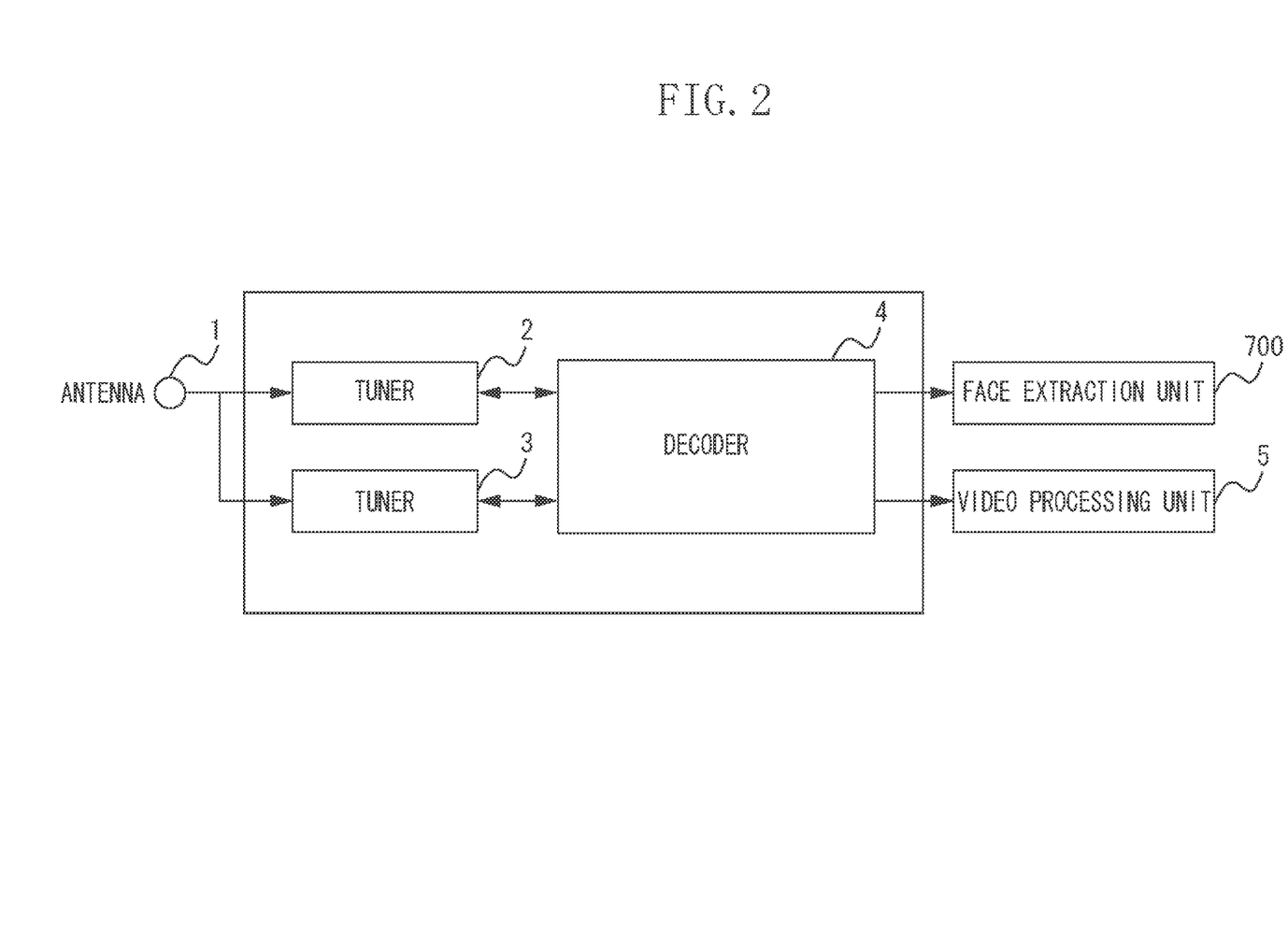
FIG. 2 is a block diagram illustrating a broadcast receiving unit according to the exemplary embodiment of the present invention.

FIG. 1 is a block diagram of the television apparatus according to a first exemplary embodiment of the present invention. FIG. 2 is a block diagram illustrating a broadcast receiving unit 100 included in the television apparatus illustrated in FIG. 1. Referring to FIG. 2, any one of a tuner 2 and a tuner 3 inputs image and audio data to a decoder 4, and the decoded image data and audio data are output to a video processing unit 5 and an audio control unit (not illustrated) respectively. The tuner 2 and the tuner 3 correspond to a first receiving unit and a second receiving unit.

One tuner is used for exposed channel selection and the other tuner is used for latent channel selection. Here, the exposed channel selection means a channel selection using a tuner which output program data of currently viewing program, and the latent channel selection means a channel selection using another tuner which does not output program data of currently viewing program.

The video data is input to the decoder 4 from other tuners, and the decoded image data is output to a face extraction unit 700. In addition to decoding the image data and the audio data, the decoder 4 performs data analysis, data separation, and data management by associating a face extraction result input from the face extraction unit 700 with program information.

The tuner 2 and the tuner 3 each receive broadcast waves from an antenna 1, select a specific frequency instructed by the decoder 4, extract broadcast signals included in the selected frequency, and output the extracted broadcast signals to the decoder 4. The tuner 2 and the tuner 3 are terrestrial digital broadcasting tuner and/or a broadcast satellite (BS)/broadband communication satellite (CS) digital broadcasting tuner.

The video data output from the decoder 4 is input to the face extraction unit 700. The face extraction unit 700 then extracts a face portion from the video data as face information and outputs the extracted result to the decoder 4.

The video processing unit 5 converts the video data input from the decoder 4 to a format appropriate for displaying on a monitor and outputs the converted data. The broadcast receiving unit 100 receives multiplexed program data from the broadcast wave and separates the received program data into image data, audio data, and information data. The video data and the audio data are then integrated and output to a display apparatus and a speaker (not illustrated), and the information data is converted to the program information.

The program information includes a broadcasting channel, start time, a title, and a genre of the program. The program data is multiplexed using the Moving Picture Experts Group 2 (MPEG 2, i.e., a second standard of the Moving Picture coding Experts Group) transport stream (TS) method.

Referring to FIG. 1, a user interface unit 200 controls the broadcast receiving unit 100, an application unit 400 (i.e., a program table generation unit), and a channel selection control unit 500 according to an instruction from a user. The user gives an instruction such as "select channel" or "display program table on different channel" using a remote controller.

A service information (SI) data management unit 300 stores and manages the program information about programs that are being broadcasted or are to be broadcasted. The SI is program arrangement information specified by Association of Radio Industries and Businesses (ARIB). The SI data is periodically transmitted by the broadcasting company and regularly updated and stored in the SI data management unit 300.

The application unit 400 generates the electric program guide data of the programs on different channels (data of a program table on different channels) using program title information read from the SI data management unit 300 and thumbnail image data read from a thumbnail management unit 800. Upon receiving an instruction to "display program table on different channels" from the user interface unit 200, the application unit 400 displays on a display screen the program table on different channels based on the data of the program table on different channels.

Each channel is weighted by the channel selection control unit 500 based on genre information about the programs being broadcasted on each channel and a periodic check table. The channel selection control unit 500 then generates a pattern of a periodic check order. The periodic check table stores the genre information associated with a periodic check frequency and is stored in the channel selection control unit 500. Further, the periodic check pattern is an order of periodically checking the channels for selecting a different channel by an unused tuner (i.e., tune in to a different channel for the latent channel selection) while displaying a video of a program selected by the user. The channel selection control unit 500 thus instructs the broadcast receiving unit 100 to tune in to a different channel according to the generated periodic check pattern.

A time management unit 600 performs time control of the system such as notifying the channel selection control unit 500 of time information according to a request from the channel selection control unit 500.

The face extraction unit 700 captures still image data from the video data of the different channel which is selected and extracts the face information from the still image data.

The thumbnail management unit 800 generates and manages the thumbnail image data by associating the program title information with the still image data for each channel.

Each of the above-described blocks is integrally controlled by a system control unit (not illustrated).

Figure 3:
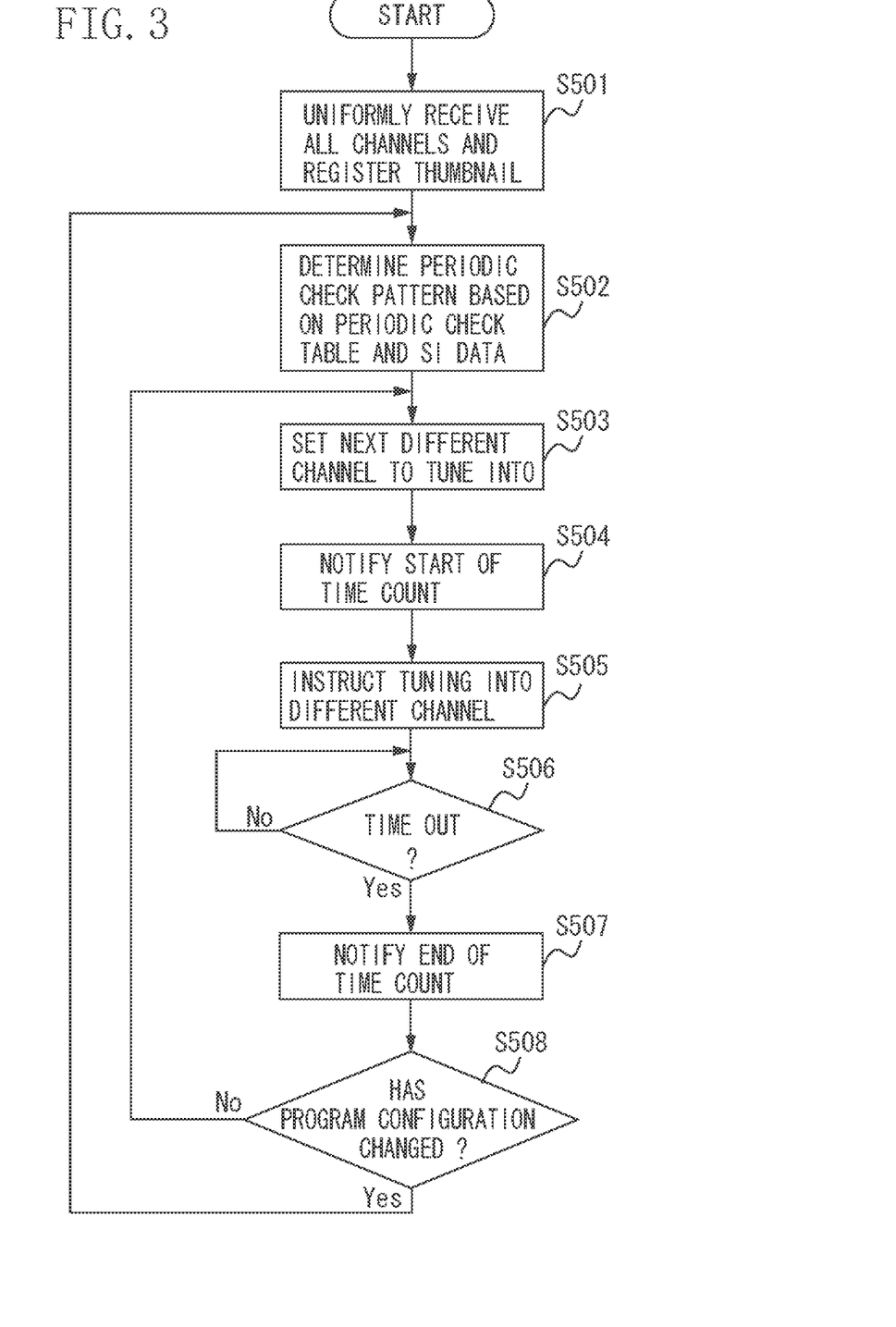
FIG. 3 is a flowchart illustrating a process performed by a program control unit according to the exemplary embodiment of the present invention.

FIG. 3 is a flowchart illustrating a process performed by the channel selection control unit 500.

In step S501, the channel selection control unit 500 receives an instruction to "switch on" from the user interface 200 and starts selecting a different channel. More specifically, the channel selection control unit 500 uniformly and periodically checks and receives all channels being broadcasted and generates the thumbnail image data from the video data of the program on the received channel. The channel selection control unit 500 then registers, in the thumbnail management unit 800, the thumbnail image data associated with channel information.

The uniform and periodic check and reception of all channels is, for example, to tune in to the different channels such as channel 1, channel 2, and channel 3, and so on, for 5 seconds each in a fixed order. Such a process can prevent a lack of the thumbnail image in the program table on different channels, even if the channel selection control unit 500 receives an instruction to display the program table on different channels directly after the television is switched on.

In step S502, the channel selection control unit 500 determines the periodic check pattern based on the periodic check table stored in the channel selection control unit 500 and the genre information about the program being broadcasted.

In step S503, the channel selection control unit 500 sets the next different channel for latent selection to tune in to based on the periodic check pattern determined in step S502. In step S504, the channel selection control unit 500 notifies the time management unit 600 to start counting the time. Upon receiving the notification, the time management 600 starts incrementing a time count value stored therein in units of seconds.

In step S505, the channel selection control unit 500 instructs the broadcast receiving unit 100 to tune in to a different channel for the latent channel selection. The process for tuning in to the different channel for the latent channel selection is thus started.

In step S506, if the time counted by the time management unit 600 from the start of tuning in to the different channel has not reached a predetermined length of time (e.g., 5 seconds) (NO in step S506), no specific process is performed. The channel selection control unit 500 continues to tune in to a different channel. On the other hand, if the time from the start of tuning in to the different channel has reached the predetermined length of time (YES in step S506), the process proceeds to step S507. In step S507, the time management unit 600 receives a time count end notification from the channel selection control unit 500 and clears a time counter (not illustrated).

In step S508, the channel selection control unit 500 checks, in the SI data management unit 300, whether a configuration of the program being broadcasted has changed. If there is no change in the program configuration (NO in step S508), the process returns to step S503. If there is a change in the configuration of the broadcasting program (YES in step S508), the process returns to step S502. Further, the channel selection control unit 500 clears the thumbnail information of the channel on which the program configuration has changed and which is managed by the thumbnail management unit 800. The above-described process is repeatedly performed while the television is switched on.

The channel selection control unit 500 determines whether the configuration of the program being broadcasted has changed by referring to a change in the program title or the program start time included in the SI data.

Figure 4:
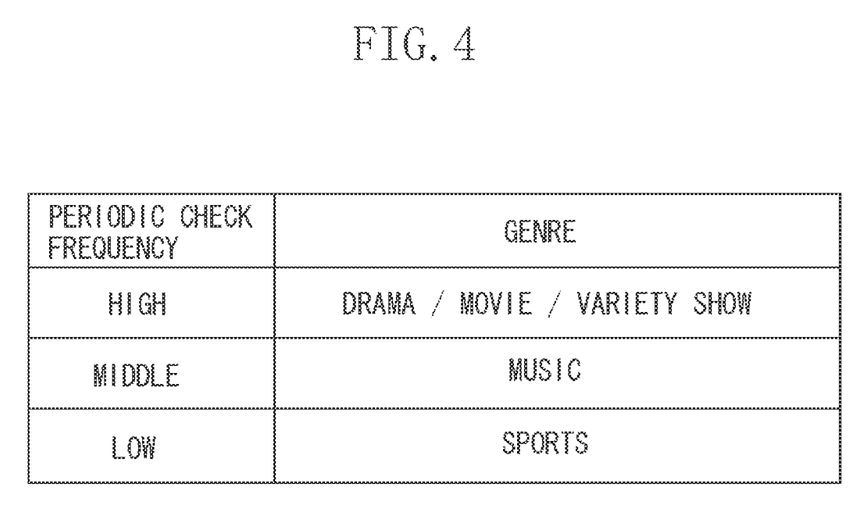
FIG. 4 illustrates an example of a periodic check table according to the exemplary embodiment of the present invention.

FIG. 4 illustrates an example of the periodic check table. Referring to FIG. 4, when the channel broadcasts programs whose genre information is dramas, movies, and variety shows, the user can easily understand the content of the program if the face information of a performer is included in the thumbnail image. Thus the periodic check frequency of such channel is set high. On the other hand, since the face information of the performer of the channel which broadcasts sports programs and the news is not as necessary as the other channels, the periodic check frequency is set low.

Figure 5:
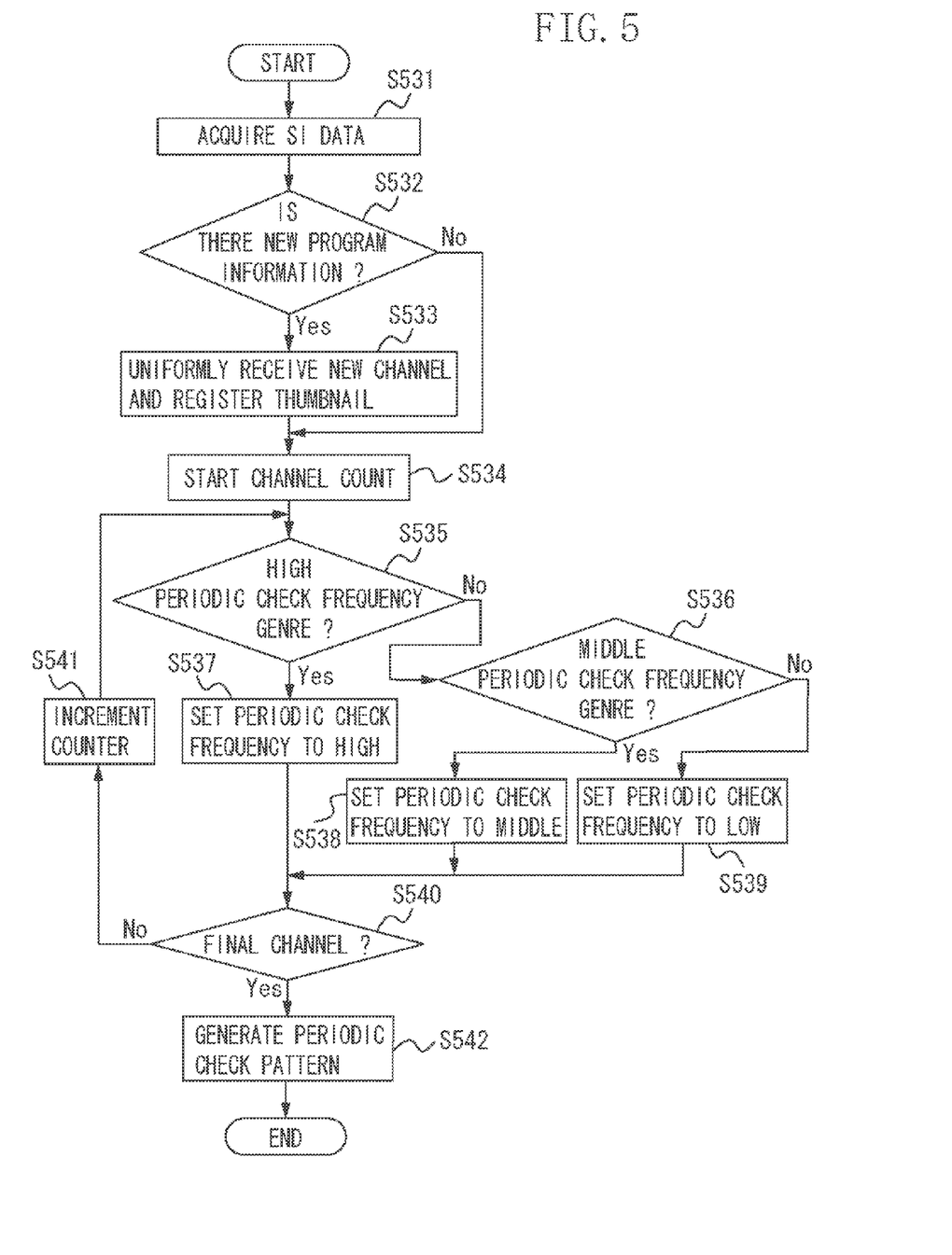
FIG. 5 is a flowchart illustrating a process for determining a periodic check pattern according to the exemplary embodiment of the present invention.

FIG. 5 is a flowchart illustrating a process for determining the periodic check pattern illustrated in step S502 of the flowchart in FIG. 3. In step S531, the channel selection control unit 500 acquires the SI data about the program being broadcasted from the SI data management unit 300. In step S532, if there is no new program information (NO in step S532), the process proceeds to step S534. In step S534, the channel selection control unit 500 starts counting a number of channels. On the other hand, if there is any channel which has just started broadcasting among the programs being broadcasted (YES in step S532), the process proceeds to step S533. In step S533, the channel selection control unit 500 uniformly and periodically checks and receives the new channel and generates the thumbnail image data from the video data.

The channel which has just started broadcasting indicates that there is a program which has been broadcasted for less than 5 minutes. According to the above-described process, even if the instruction to "display program table on different channels" is received directly after the program to be broadcasted is changed, it can prevent a lack of the thumbnail image in the program table on the different channels.

In step S535 to step S539, the channel selection control unit 500 determines the periodic check frequency of each channel based on the genre information about the programs. The channel selection control unit 500 then compares the number of channels whose periodic check frequencies are determined with the total number of channels. If there is any channel whose periodic check frequency is not determined (NO in step S540), the process proceeds to step S541. In step S541, the channel selection control unit 500 increments a channel counter and determines the periodic check frequency of the undetermined channel. After all the channels that are broadcasting the programs have been checked, the process proceeds to step S542. In step S542, the channel selection control unit 500 generates the periodic check pattern based on the determined periodic check frequency of each channel.

A periodic check method in which the check frequency is changed for each channel will be described below. For example, three channels are being broadcasted, and genre information about channel 1 is a drama, about channel 2 is music, and about channel 3 is sports. According to the periodic check table, the periodic check frequency of channel 1 is set to "high", channel 2 is set to "middle", and channel 3 is set to "low". It is assumed that the periodic checks is performed three times for high frequency, twice for middle frequency, and once for low frequency per cycle. Thus, the periodic check is performed three times for channel 1, twice for channel 2, and once for channel 3. The periodic check pattern may become channel 1, channel 1, channel 1, channel 2, channel 2, channel 3, and so on.

Alternatively, the periodic check pattern can be channel 1, channel 2, channel 1, channel 2, channel 1, channel 3, and so on.

Figure 6:
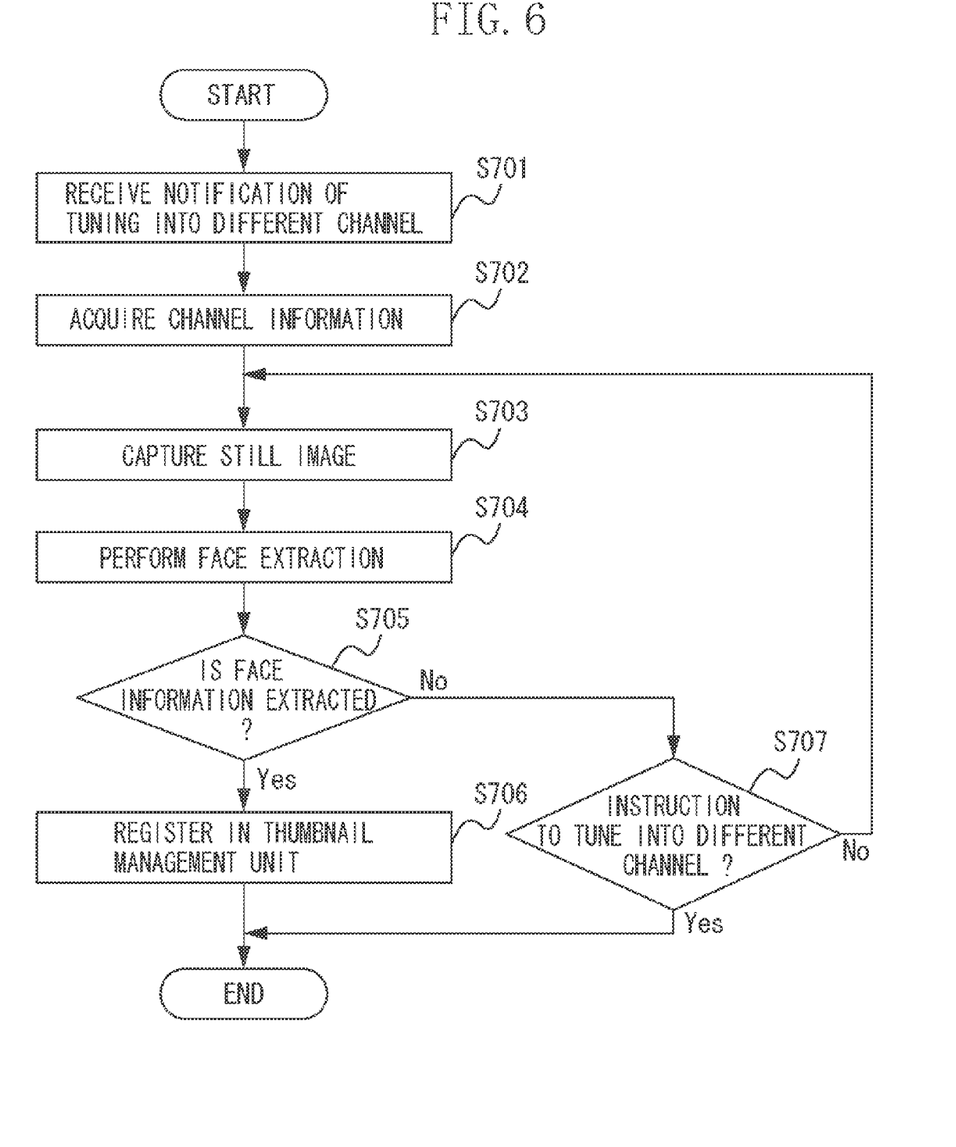
FIG. 6 is a flowchart illustrating a process performed by the face extraction unit according to the exemplary embodiment of the present invention.

FIG. 6 is a flowchart illustrating a process for generating the thumbnail image data. The face extraction unit 700 constantly acquires, from the broadcast receiving unit 100, video information by tuning in to the different channel. In step S701, the face extraction unit 700 receives from the broadcast receiving unit 100 notification of tuning in to the different channel for the latent channel selection. In step S702, the face extraction unit 700 acquires, from the broadcast receiving unit 100, the channel information about the different channel currently being tuned in to. In step S703, the face extraction unit 700 captures the still image from the video data of the program on the channel being tuned in to. In step S704, the face extraction unit 700 performs face extraction on the captured still image data.

A known method can be applied to a face extraction method. An example of the face extraction method using skin color detection will be described below. Only pixels included in a pre-defined skin color space are selected based on R, G, and B values of each pixel configuring the still image. If an image region formed only by the selected pixels has an area greater than or equal to a predetermined threshold value and a predetermined shape (such as oval), the image region is determined as a face image.

In step S705, if the face information is included in the captured still image (YES in step S705), the process proceeds to step S706. In step S706, the still image data is associated with the channel information and registered in the thumbnail management unit 800 as the thumbnail image data. If the face information is detected in the program on each channel when the channels are periodically checked, the thumbnail image is updated to the latest one.

On the other hand, if there is no face information in the still image (NO in step S705), the process proceeds to step S707.

In step S707, if there is an instruction to tune in to the next different channel for the latent channel selection (YES in step S707), the process is ended. If there is no instruction to tune in to the next different channel for the latent channel selection (NO in step S707), the process return to step S703 and the still image is captured for the same channel. In other words, the face extraction process is performed a plurality of times for the program on the same channel until there is an instruction to tune in to the next different channel.

Figure 7:
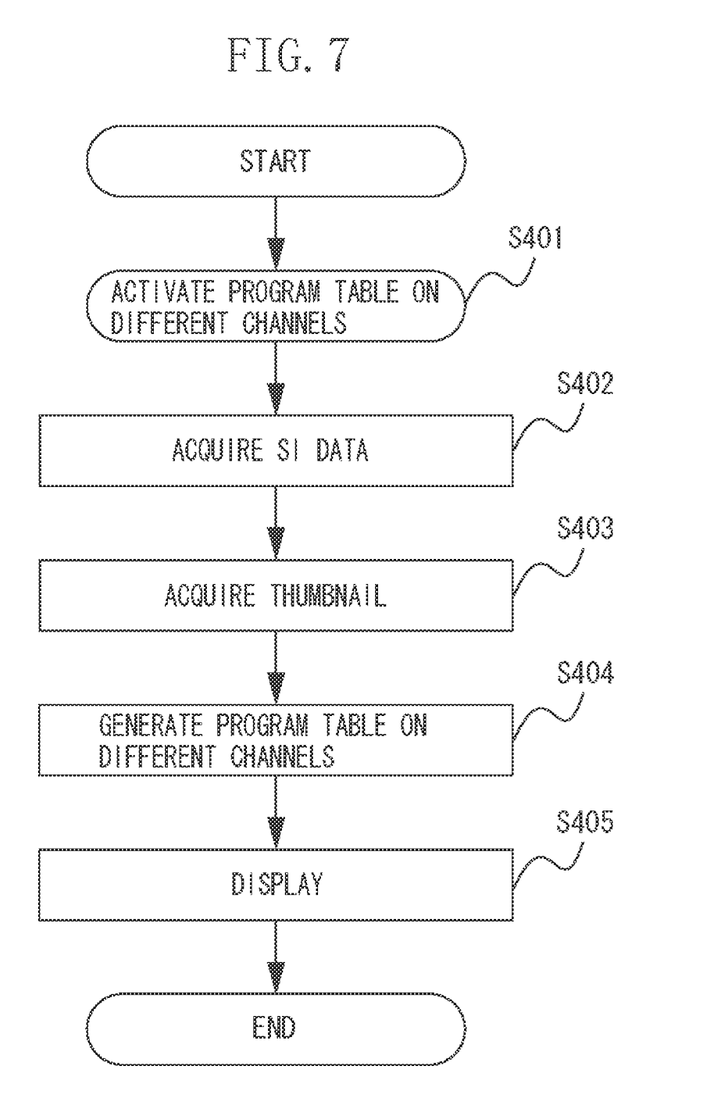
FIG. 7 is a flowchart illustrating a process performed by an application unit according to the exemplary embodiment of the present invention.

FIG. 7 is a flowchart illustrating a process performed by the application unit 400. In step S401, the application unit 400 receives the instruction to "display program table on different channels" from the user interface unit 200. In step S402, the application unit 400 acquires the SI data about the program being broadcasted from the SI data management unit 300.

Figure 8:
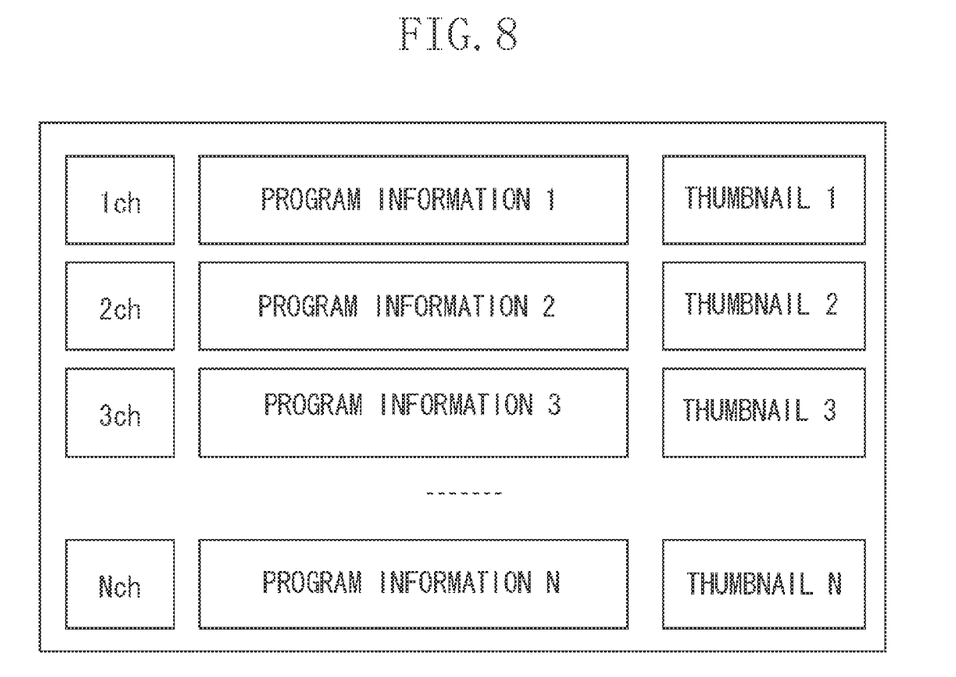
FIG. 8 is a schematic diagram illustrating an example of displaying a program table on different channels according to the exemplary embodiment of the present invention.

In step S403, the application unit 400 acquires, from the thumbnail management unit 800, the channel information and the thumbnail image data. In step S404, the application unit 400 combines the acquired SI data and the thumbnail image data and generates the program table on different channels. In step S405, the application unit 400 displays the generated program table on different channels on the monitor. FIG. 8 illustrates an example of the program table on different channels.

As described above, by changing the periodic check pattern according to the genre of the program, channels can be periodically checked and received with efficiency, centering on the channels with higher importance. Further, the user can effectively understand the program content since the thumbnail image corresponding to the program on each channel is generated and displayed on the program table on different channels.

In the first exemplary embodiment, the thumbnail images are replaced every time the face is extracted, so that the latest image is always displayed. In contrast, in a second exemplary embodiment, the thumbnail image of the face of a person which is most frequently detected is displayed for one program in the program table on different channels.

Figure 9:
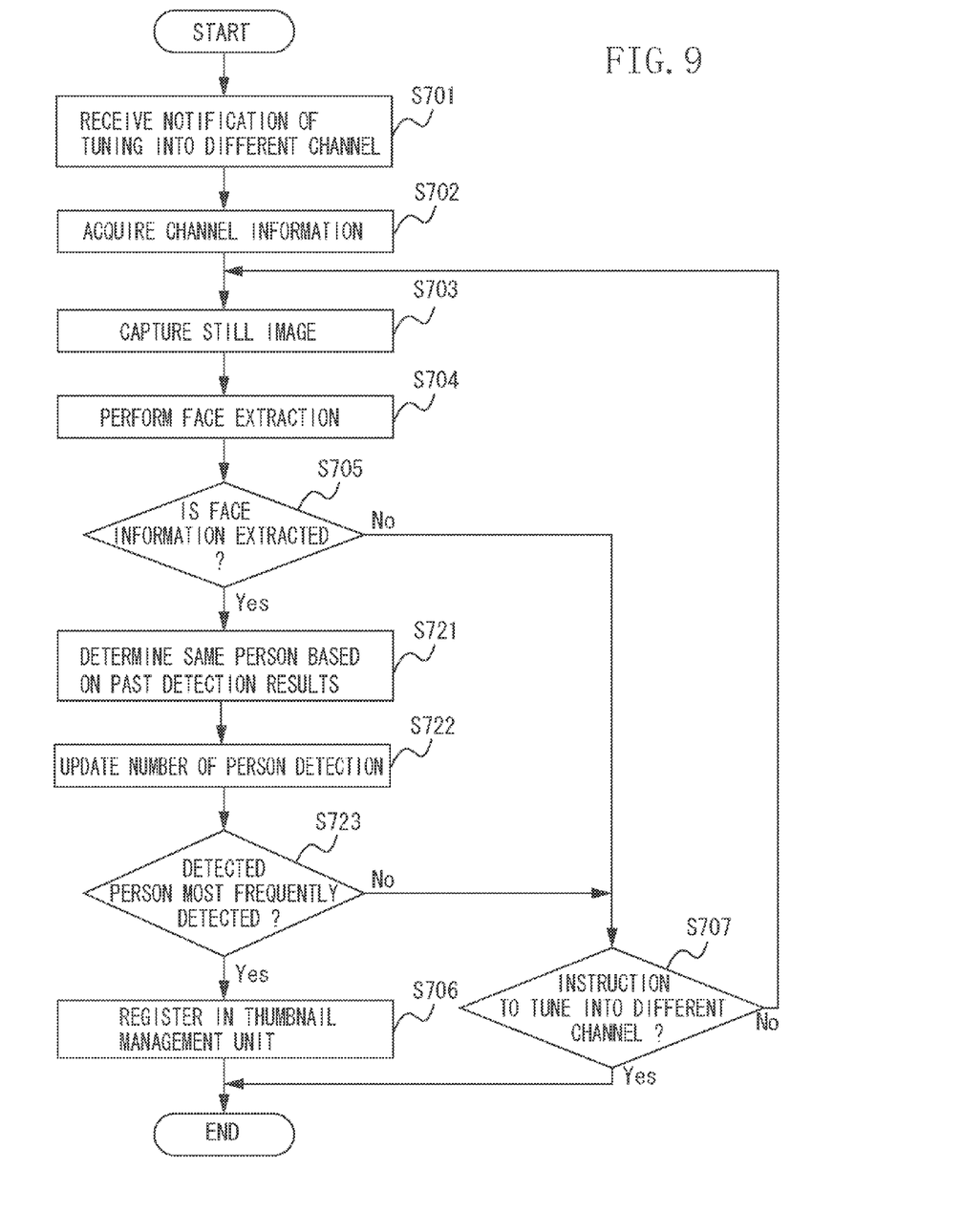
FIG. 9 is another flowchart illustrating a process performed by the face extraction unit according to the exemplary embodiment of the present invention.

FIG. 9 is a flowchart illustrating a process performed by the face extraction unit 700 in the present exemplary embodiment. Description of the processes which are similar to the processes in the first exemplary embodiment will be omitted. In step S705, if the face extraction unit 700 determines that there is the face information in the captured still image (YES in step S705), the process proceeds to step S721. In step S721, the face extraction unit 700 determines the same person from past detection results temporarily managed by the thumbnail management unit 800.

The determination of the same person using the face can be performed by employing a known method. As an example, a method for determining the same person by calculating a degree of similarity using pattern matching will be described below. A mutual subspace method is used to compare an image pattern of the face information with a pre-arranged image pattern of each person to identify the person of the extracted face information. The mutual subspace method is a pattern matching method which uses a canonical angle formed between the two subspaces as a similarity measure. As a result of the comparison, the person whose degree of similarity is greater than or equal to a predetermined value is determined as the same person.

In step S722, a table of a detection frequency of a person (not illustrated) stored in the thumbnail management unit 800 is updated. The table of the detection frequency of a person stores the detection frequency of each person in the same program. For example, the table manages information that a person A is detected twice and a person B is detected once. If the person A is again detected, the detection frequency of person A becomes three. Further, the table of the detection frequency of a person is updated when a person who has not been detected in the past is newly detected.

In step S723, if a person who is detected is determined as a person who has been most frequently detected according to the table of the detection frequency of a person (YES in step S723), the process proceeds to step S706. In step S706, the face detection unit 700 registers the captured still image as the thumbnail image in the thumbnail management unit 800. On the other hand, if the person who is detected is not the person who has been most frequently detected according to the table of the detection frequency of a person (NO in step S723), the process proceeds to step S707. In step S707, if there is an instruction to tune in to the next different channel for the latent channel selection (YES in step S707), the process is ended. If there is no instruction to tune in to the next different channel for the latent channel selection (NO in step S707), the face detection unit 700 continues to capture the still image on the same channel.

When the program table on different channels is displayed, the face information temporarily managed by the thumbnail management unit 800 can be displayed side by side with the thumbnail images. In such a case, performers other than a main performer are also displayed, so that it is effective for the user to understand the program content.

As described above, according to the second exemplary embodiment, the main performer of each program is displayed by displaying the thumbnail image that includes the face of the person who is most frequently detected in the program table on different channels.

A third exemplary embodiment describes a process for terminating the periodic check and reception of a channel in which the detection frequency of a person whose face is extracted is greater than a specific maximum detection frequency, or a program is near the end. In the present exemplary embodiment, each channel is weighted by the channel selection control unit 500 based on the maximum detection frequency of the person in the thumbnail image, the genre information about the program being broadcasted, and the periodic check table. The channel selection control unit 500 then generates the periodic check pattern and instructs the broadcast receiving unit 100 to tune in to the different channel according to the generated periodic check pattern.

Figure 10:
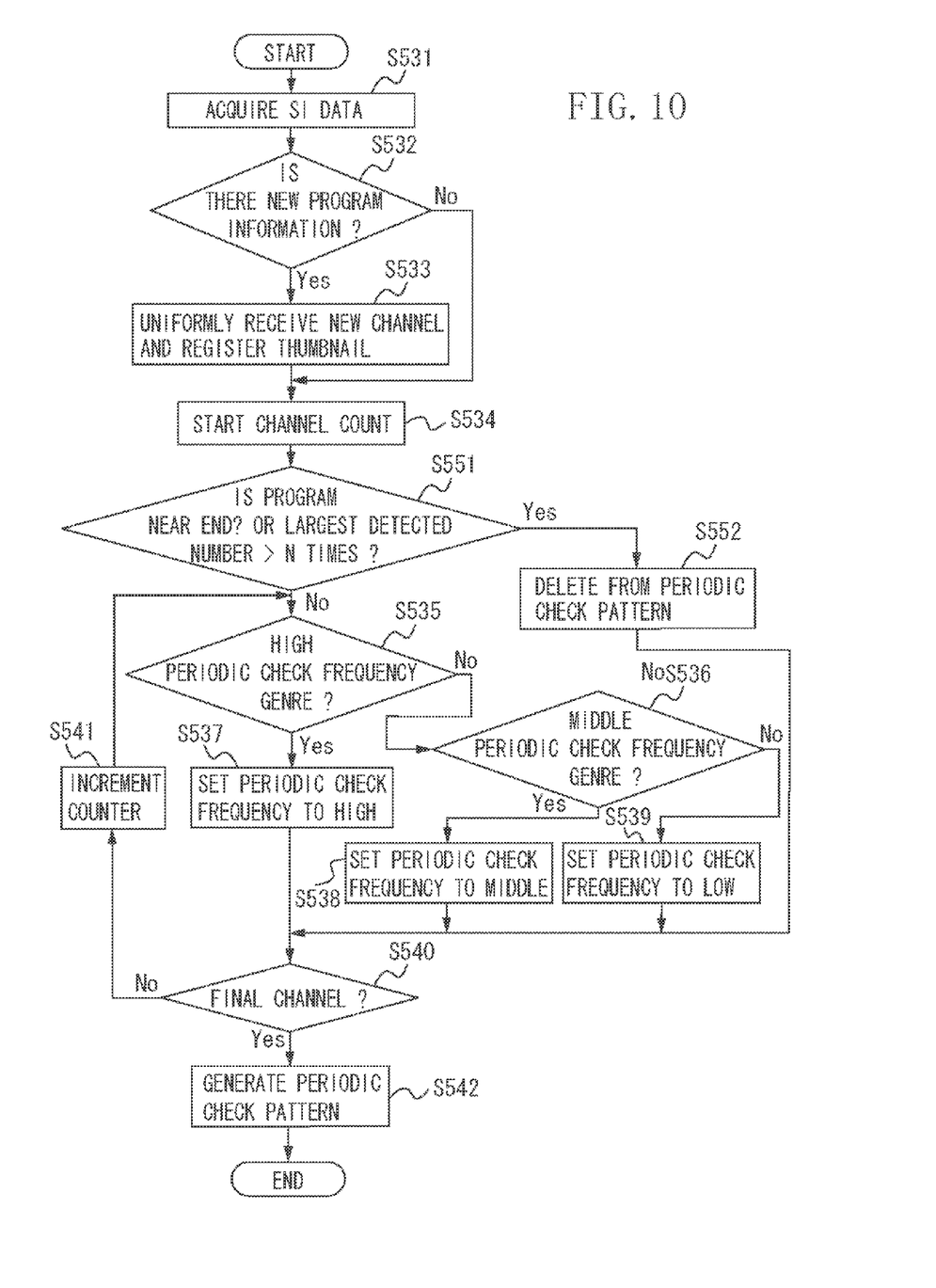
FIG. 10 is a flowchart illustrating in detail a process performed by a channel selection control unit according to the exemplary embodiment of the present invention.

FIG. 10 is a flowchart illustrating in detail the process for determining the periodic check pattern performed by the channel selection control unit 500. Description of the processes similar to the processes in the first exemplary embodiment will be omitted.

In step S551, if the channel selection control unit 500 determines whether the program is near the end or the maximum detection frequency of the person in the thumbnail image acquired from the thumbnail management unit 800 exceeds a predetermined number (YES in S551), the process proceeds to step S552. In step S552, the channel selection control unit 500 determines that it is not necessary to periodically check the channel any further and deletes the channel from the periodic check pattern.

The program is determined to be near the end when the program is currently within a predetermined time period (e.g. less than 5 minutes) from scheduled ending time of the program. Further, the maximum detection frequency of the person in the thumbnail image is determined to exceed the predetermined number when, for example, the same person is detected 20 times or more.

As described above, according to the third exemplary embodiment, the channel is deleted from candidates to be periodically checked if the program is near the end of broadcasting or a specific person is detected more than a predetermined number of times. As a result, the frequency of tuning in to the different channels is increased for each channel, so that face extraction can be efficiently performed.

In the first exemplary embodiment, once the periodic check pattern is determined, it is not changed until there is an instruction to tune in to the next different channel. In contrast, in a fourth exemplary embodiment, the channel in which the face information is not detected is placed at the top of the next periodic check.

In the present exemplary embodiment, the channel selection control unit 500 reads a channel number stored in a storage memory. The channel selection control unit 500 then places the read channel at the top of the next periodic check pattern and instructs the broadcast receiving unit 100 to tune in to the different channel. The face extraction unit 700 extracts the face from information about the different channel tuned in to which is received by the broadcast receiving unit 100. The face extraction unit 700 generates the thumbnail image when the face can be extracted. Further, the face extraction unit 700 registers, in the storage memory, the channel number of the program from which the face cannot be extracted.

The storage memory manages the channel number of the program from which the face extraction unit 700 could not extract a face.

Figure 11:
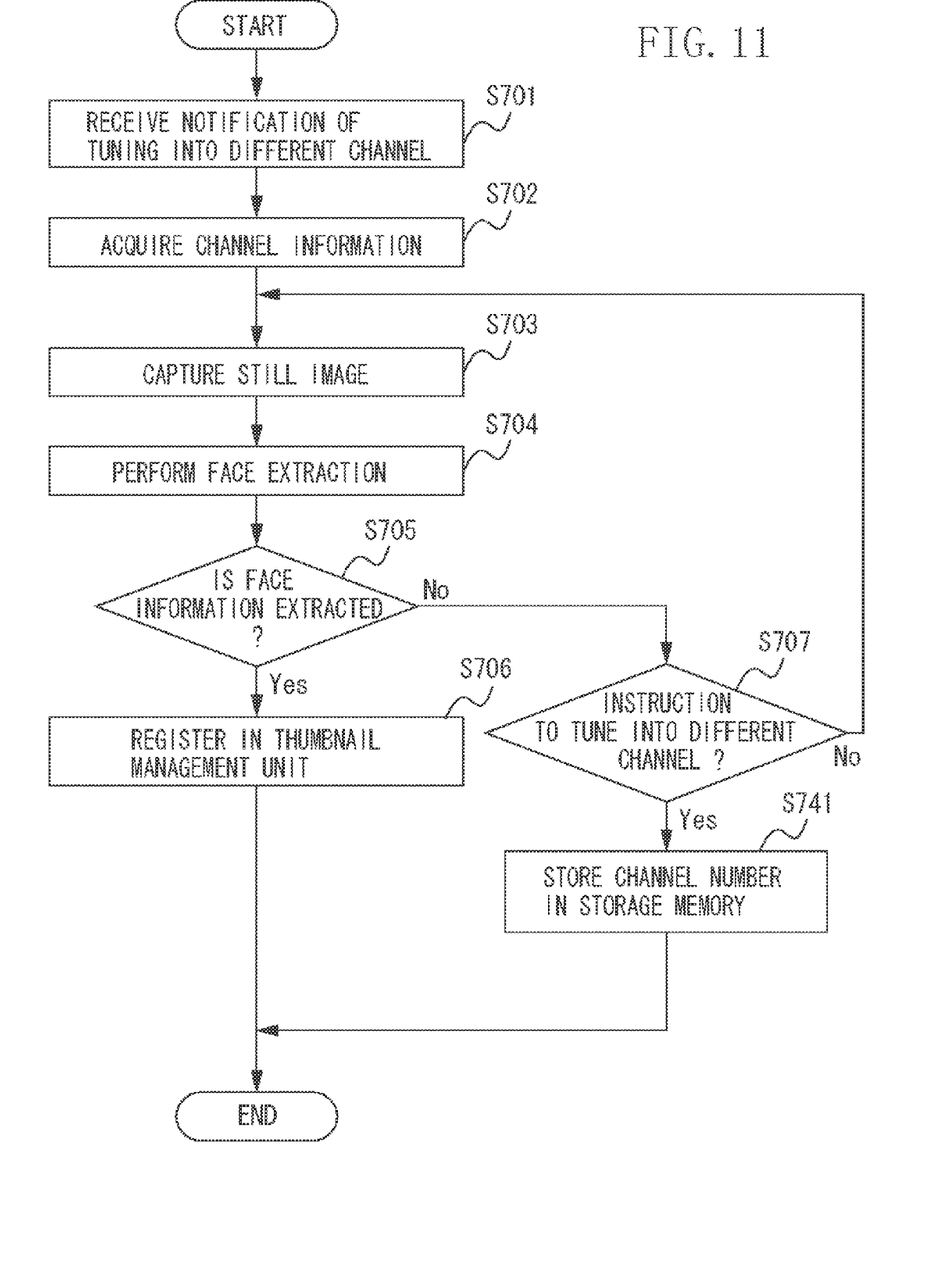
FIG. 11 is another flowchart illustrating a process performed by the face extraction unit according to the exemplary embodiment of the present invention.

FIG. 11 is a flowchart illustrating a process performed by the face extraction unit 700. Description of the processes similar to the processes in the first exemplary embodiment will be omitted.

In step S705, if there is no face information in the captured still image (NO in step S705), the process proceeds to step S707. In step S707, if there is an instruction to tune in to the next different channel for the latent channel selection (YES in step S707), the process proceeds to step S741. In step S741, the face extraction unit 700 registers the channel number in the storage memory, and the process is ended.

Figure 12:
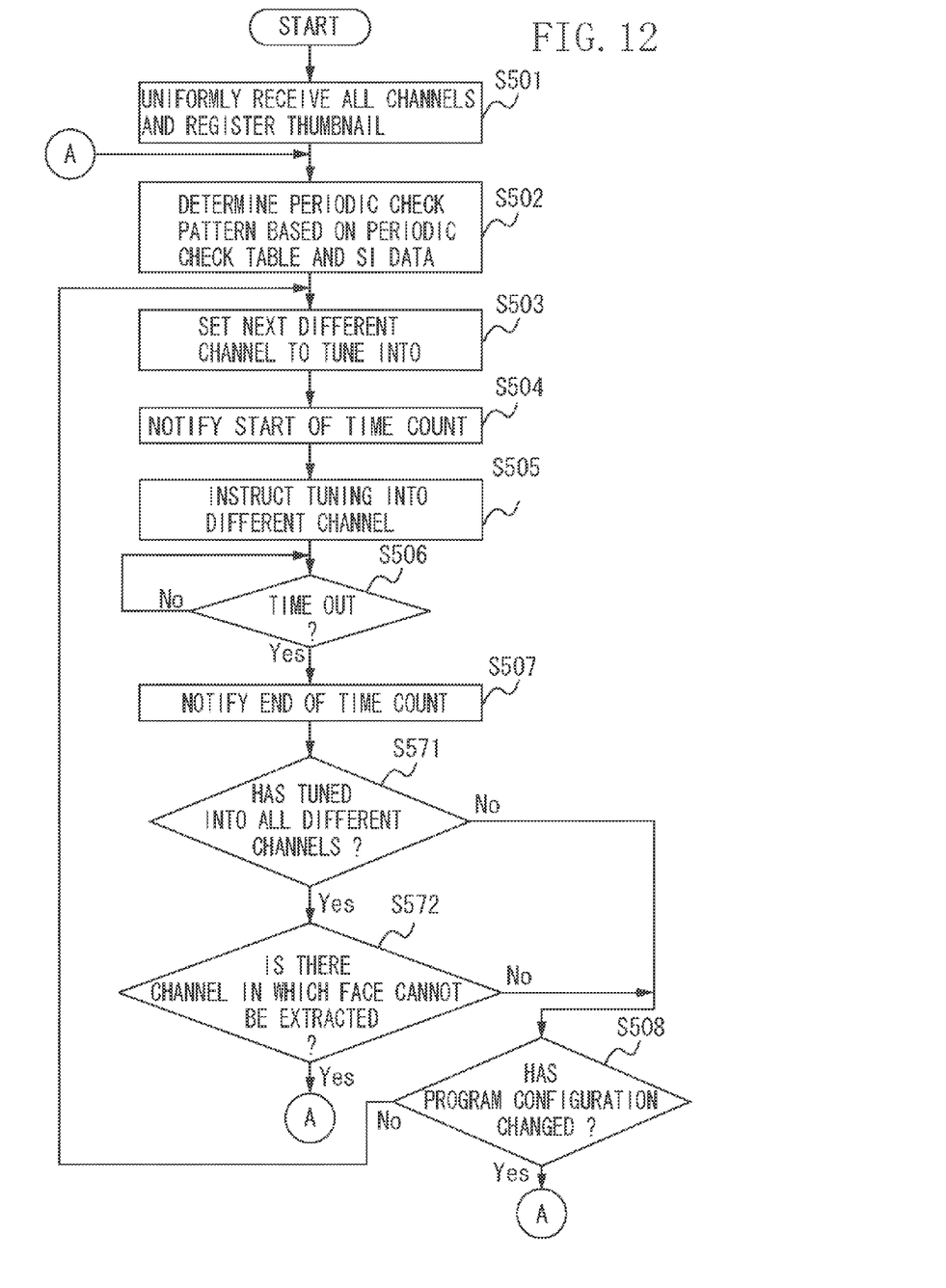
FIG. 12 is another flowchart illustrating a process performed by the channel selection control unit according to the exemplary embodiment of the present invention.

FIG. 12 is a flowchart illustrating the process performed by the channel selection control unit 500.

In step S571, the channel selection control unit 500 determines whether a channel selection operation has been performed once around. If the channel selection operation has not been performed once around (NO in step S571), the process proceeds to step S508. In step S508, the channel selection control unit 500 determines whether the program configuration has changed. On the other hand, if the channel selection operation has been performed once around (YES in step S571), the process proceeds to step S572. In step S572, if the channel selection control unit 500 determines that there is no channel, in the storage memory, from which the face cannot be extracted during previous tuning in to the different channels for the latent channel selection (NO in step S572), the process proceeds to step S508. In step S508, the channel selection control unit 500 determines whether the program configuration has changed. On the other hand, if there is a channel from which the face cannot be extracted (YES in step S572), the process returns to step S502.

Figure 13:
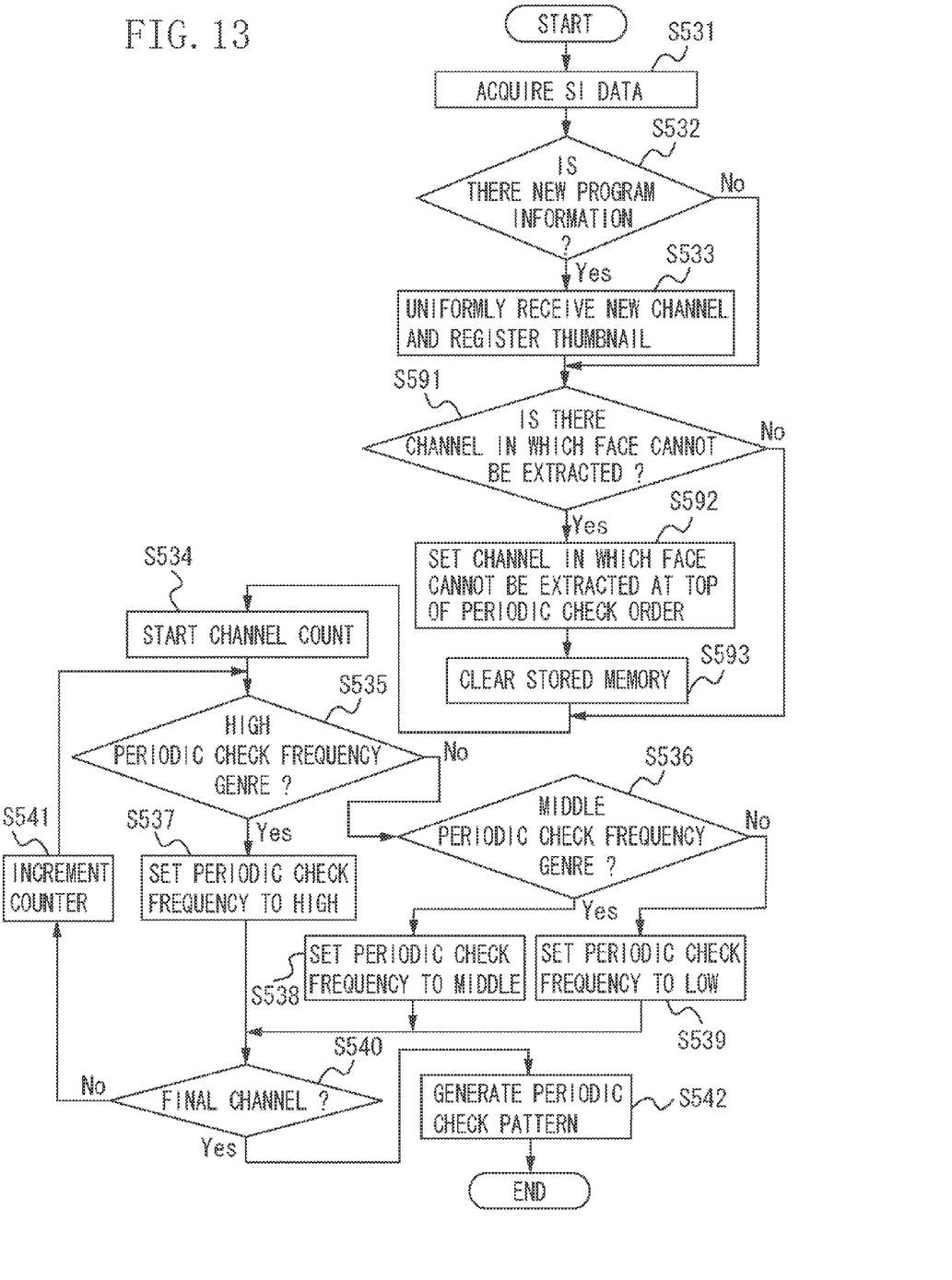
FIG. 13 is a flowchart illustrating in detail a process performed by the channel selection control unit according to the exemplary embodiment of the present invention.

FIG. 13 is a flowchart illustrating in detail a process for determining the periodic check pattern performed by the channel selection control unit 500. Description of the processes similar to the processes in the first exemplary embodiment will be omitted.

In step S591, the channel selection control unit 500 determines whether there is the channel information, in the storage memory, about the channel from which the face cannot be extracted during the previous tuning in to the different channels. If there is no channel information about the channel from which the face cannot be extracted (NO in step S591), the process proceeds to step S534. In step S534, the channel selection control unit 500 starts counting the number of channels. On the other hand, if there is the channel information about the channel from which the face cannot be extracted (YES in step S591), the process proceeds to step S592. In step S592, the channel selection control unit 500 sets the channel from which the face cannot be extracted at the top of the periodic check order. In step S593, the channel selection control unit 500 clears the storage memory. In step S534, the channel selection control unit 500 starts counting the number of channels. If there is a plurality of channels from which the face cannot be extracted, the channel selection control unit 500 aligns the channels in the order of the channel numbers and sets the periodic check order.

As described above, according to the present exemplary embodiment, the channel from which the face information is not acquired during the previous tuning in to the different channels is placed at the top of the next periodic check order. As a result, a case where the thumbnail image is not displayed in the program table on different channels becomes less likely to occur.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-266525 filed Oct. 15, 2008, which is hereby incorporated by reference herein in its entirety.

What is claimed is:

1. A television apparatus including a plurality of receiving units, the television apparatus comprising:
   a first receiving unit configured to receive a channel which broadcasts a program whose video image is displayed on a display unit; a second receiving unit configured to receive a plurality of channels while the video image is being displayed;
   a program information management unit configured to store genre information of programs broadcasted on the plurality of channels; and
   a control unit configured to determine a periodic check order and a periodic check frequency of receiving the plurality of channels based on the genre information of the programs read by the program information management unit and to control the second receiving unit to receive the plurality of channels sequentially according to the periodic check order,
   wherein the control unit redetermines the periodic check order and the periodic check frequency of receiving the plurality of channels in response to a change of a configuration of the video image being displayed.

2. The television apparatus according to claim 1, further comprising:
   a face extraction unit configured to extract face information from still image data captured from video data of programs on the plurality of channels received by the second receiving unit;
   a thumbnail management unit configured to generate thumbnail image data of the programs from the still image data from which the face information has been extracted and program title information of the channel; and a program table generation unit configured to generate an electronic program table data using the thumbnail image data.

3. The television apparatus according to claim 2, wherein the thumbnail image data is generated, using still image data which includes face information of a person which is most frequently extracted by the face extraction unit.

4. The television apparatus according to claim 2, wherein the control unit changes the periodic check order so that a channel which broadcasts a program from which the face extraction unit did not extract the face information comes at the top of the periodic check order.

5. The television apparatus according to claim 1, wherein the control unit determines the periodic check frequency so that the periodic check frequency is higher when genre information of a program is information indicating at least one of a drama, a movie and a variety show than when genre information of a program is information indicating music.

6. The television apparatus according to claim 1, wherein the control unit does not select the channel when a program being broadcasted on the channel is scheduled to end within a predetermined time from a current time.

7. The television apparatus according to claim 1, wherein the control unit determines the periodic check frequency so that the periodic check frequency is lower when genre information of a program is information indicating at least one of news and a sport than when genre information of a program is information indicating music.

8. The television apparatus according to claim 1, wherein the change of the configuration of the video image being displayed is a change of the program.

9. The television apparatus according to claim 1, further comprising a determination unit configured to determine whether the configuration of the video image being displayed has been changed,
wherein the control unit redetermines, in a case where the determination unit determines that the configuration of the video image being displayed has been changed, the periodic check order and the periodic check frequency of receiving the plurality of channels.

10. A method for controlling a television apparatus which includes a plurality of receiving units, the method comprising:
displaying on a display unit a video image of a program on a channel received by a first receiving unit;
receiving on a second receiving unit a plurality of channels while the video image is being displayed;
storing genre information of programs broadcasted on the plurality of channels; and
determining a periodic check order and a periodic check frequency of receiving the plurality of channels based on the genre information of the programs,
wherein the second receiving unit receives the plurality of channels sequentially according to the determined periodic check order,
wherein the determining step redetermines the periodic check order and the periodic check frequency of receiving the plurality of channels in response to a change of a configuration of the video image being displayed.

11. The method for controlling a television apparatus according to claim 10, further comprising:
extracting face information from still image data captured from video data of programs on the plurality of channels received by the second receiving step;
generating thumbnail image data of the programs from the still image data from which the face information has been extracted and program title information of the channel; and
generating an electronic program table data using the thumbnail image data.

12. The method for controlling a television apparatus according to claim 11, wherein the thumbnail image data is generated, using still image data which includes face information of a person which is most frequently extracted by the extracted step.

13. The method for controlling a television apparatus according to claim 11, wherein the determining step changes the periodic check order so that a channel which broadcasts a program from which the face extraction unit did not extract the face information comes at the top of the periodic check order.

14. The method for controlling a television apparatus according to claim 10, wherein the determining step determines the periodic check frequency so that the periodic check frequency is higher when genre information of a program is information indicating at least one of a drama, a movie and a variety show than when genre information of a program is information indicating music.

15. The method for controlling a television apparatus according to claim 10, wherein the determining step does not select the channel when a program being broadcasted on the channel is scheduled to end within a predetermined time from a current time.

16. The method for controlling a television apparatus according to claim 10, wherein the determining step determines the periodic check frequency so that the periodic check frequency is lower when genre information of a program is information indicating at least one of news and a sport than when genre information of a program is information indicating music.

* * * * *